US012704258B2

(12) United States Patent
Mueller-Hagedorn et al.

(10) Patent No.: US 12,704,258 B2
(45) Date of Patent: Aug. 11, 2026

(54) METHOD AND APPARATUS FOR REGULATING A FLAME LENGTH IN A PARTIAL OXIDATION REACTOR

(71) Applicant: L'Air Liquide, Société Anonyme pour l'Etude et l'Exploitation des Procédés Georges Claude, Paris (FR)

(72) Inventors: Matthias Mueller-Hagedorn, Frankfurt am Main (DE); Bernard Labegorre, Paris (FR); Arthur Degeneve, Les Loges-en-Josas (FR); Paul Jourdaine, Paris (FR); Jean Caudal, Versailles (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 553 days.

(21) Appl. No.: 17/854,588

(22) Filed: Jun. 30, 2022

(65) Prior Publication Data

US 2023/0003381 A1 Jan. 5, 2023

(30) Foreign Application Priority Data

Jun. 30, 2021 (EP) .................................... 21020332

(51) Int. Cl.
*F23N 3/00* (2006.01)
*B01J 19/24* (2006.01)
(Continued)

(52) U.S. Cl.
CPC .......... *F23N 3/002* (2013.01); *B01J 19/2405* (2013.01); *B01J 19/26* (2013.01); *C01B 3/363* (2013.01);
(Continued)

(58) Field of Classification Search
CPC .. B01J 10/005; B01J 19/0013; B01J 19/0053; B01J 19/2405; B01J 19/26; B01J 19/325;
(Continued)

(56) References Cited

U.S. PATENT DOCUMENTS 3,847,564 A * 11/1974 Marion .................. F23L 7/005 252/373
4,245,980 A * 1/1981 Reed ......................... F23C 7/02 431/351
(Continued)

FOREIGN PATENT DOCUMENTS

DE 20 2014 105403 U1 12/2014
DE 10 2015 015526 A1 6/2017
(Continued)

OTHER PUBLICATIONS

Degeneve, A. et all, Scaling relations for the length of coaxial oxy-flames with and without swirl, Proceeding of the Combustion Institute, 37 (4), 2018, 4563-4570.
(Continued)

*Primary Examiner* — Steven B McAllister
*Assistant Examiner* — Benjamin W Johnson
(74) *Attorney, Agent, or Firm* — Allen E. White; Elwood L. Haynes

(57) ABSTRACT

An apparatus (having at least one burner having a plurality of co-axial channels and a control system for regulating a length of a flame for partial oxidation of hydrocarbon feed in a reactor is provided. The at least one burner has a first channel to inject a stream of oxidizer, a second channel to inject a stream of the hydrocarbon feed and a third channel to inject a stream of swirl gas at a first velocity into the hydrocarbon feed stream. The control system regulates the length of the flame to have a constant flame shape and position by regulating the first velocity of the swirl gas that
(Continued)

generates the swirl motion within the hydrocarbon feed stream.

19 Claims, 6 Drawing Sheets

(51) Int. Cl.

| | |
|---|---|
| ***B01J 19/26*** | (2006.01) |
| ***C01B 3/363*** | (2026.01) |
| ***F23D 11/10*** | (2006.01) |
| ***F23D 11/38*** | (2006.01) |
| ***F23D 14/24*** | (2006.01) |
| ***F23D 14/58*** | (2006.01) |
| ***F23D 14/84*** | (2006.01) |
| *B01J 10/00* | (2006.01) |
| *B01J 19/00* | (2006.01) |
| *B01J 19/32* | (2006.01) |
| *C01B 3/24* | (2006.01) |
| *F23D 17/00* | (2006.01) |

(52) U.S. Cl.
CPC .......... *F23D 11/105* (2013.01); *F23D 11/383* (2013.01); *F23D 14/24* (2013.01); *F23D 14/58* (2013.01); *F23D 14/84* (2013.01); *B01J 10/005* (2013.01); *B01J 19/0013* (2013.01); *B01J 19/0053* (2013.01); *B01J 19/325* (2013.01); *C01B 3/24* (2013.01); *C01B 2203/0205* (2013.01); *C01B 2203/025* (2013.01); *C01B 2203/141* (2013.01); *F23D 17/002* (2013.01); *F23N 2223/42* (2020.01); *F23N 2225/16* (2020.01); *F23N 2237/24* (2020.01)

(58) Field of Classification Search
CPC ... C01B 3/24; C01B 3/363; C01B 2203/0205; C01B 2203/025; C01B 2203/141; F23D 11/105; F23D 11/383; F23D 14/24; F23D 14/58; F23D 14/84; F23D 17/002; F23N 3/002; F23N 2223/42; F23N 2225/16; F23N 2237/24
USPC .......................................................... 431/18
See application file for complete search history.

(56) References Cited

U.S. PATENT DOCUMENTS

| | | | | |
|---|---|---|---|---|
| 5,295,818 | A * | 3/1994 | Robinson | F23N 5/123 431/77 |
| 5,653,916 | A | 8/1997 | Disselhorst et al. | |
| 2008/0093583 | A1 | 4/2008 | Van den Oosterkamp et al. | |
| 2009/0053128 | A1* | 2/2009 | Bedetti | F23D 14/02 422/198 |
| 2014/0070143 | A1* | 3/2014 | Mueller-Hagedorn | C01B 3/363 252/373 |
| 2016/0176710 | A1 | 6/2016 | Zanichelli | |
| 2019/0293285 | A1* | 9/2019 | Nett | F23L 9/04 |

FOREIGN PATENT DOCUMENTS

| | | |
|---|---|---|
| DE | 20 2017 107808 U1 | 1/2018 |
| EP | 3 017 249 | 10/2017 |
| JP | H04 52418 | 2/1992 |

OTHER PUBLICATIONS

Schumaker, A. et al., Coaxial turbulent jet flames: scaling relations for measured stoichiometric mixing lengths, Proc. Comb. Inst. 2009, 32, 1655-1662.

European Search Report and Written Opinion for corresponding EP 21020332, Dec. 7, 2021.

* cited by examiner

Figure 6:
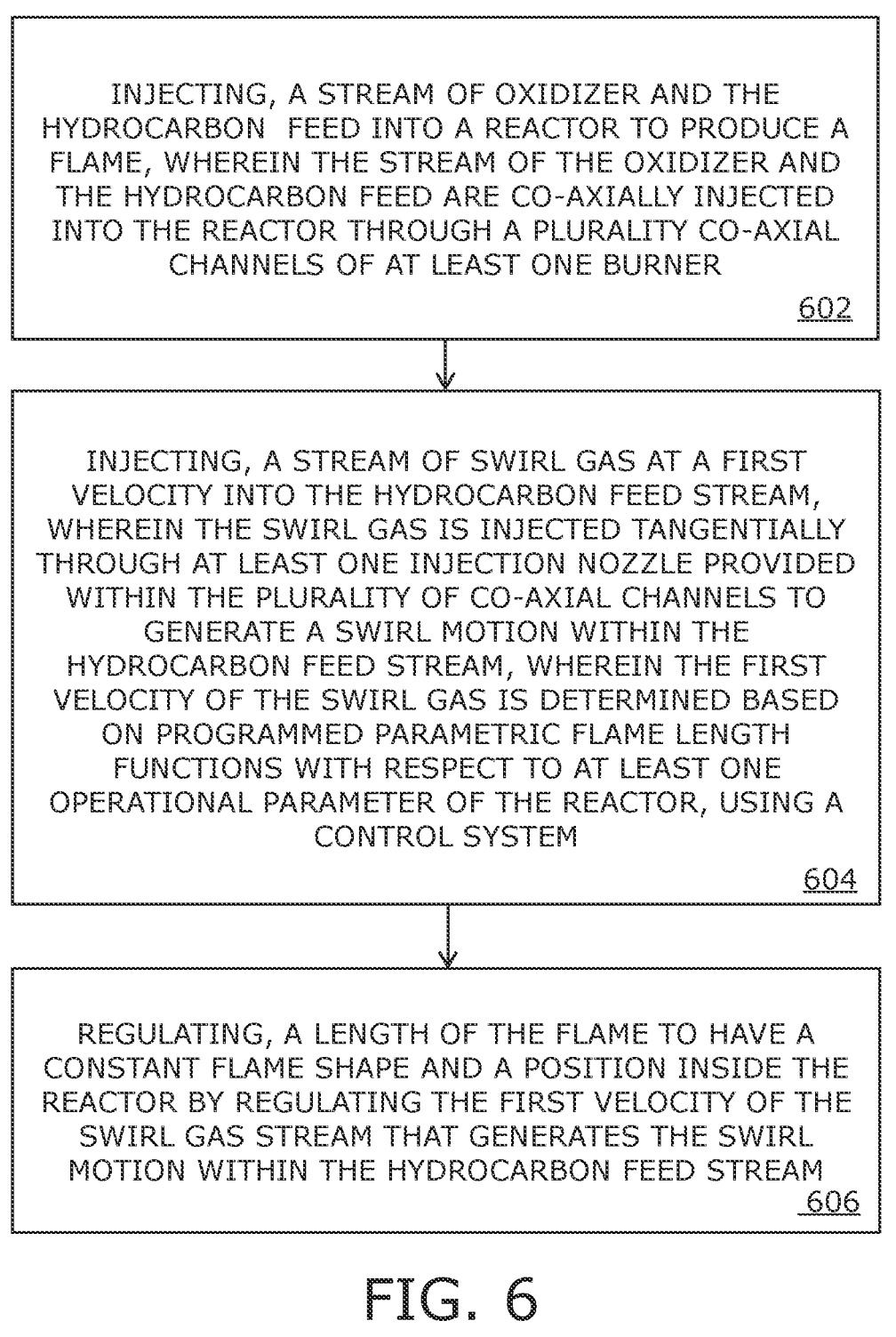

INJECTING, A STREAM OF OXIDIZER AND THE HYDROCARBON FEED INTO A REACTOR TO PRODUCE A FLAME, WHEREIN THE STREAM OF THE OXIDIZER AND THE HYDROCARBON FEED ARE CO-AXIALLY INJECTED INTO THE REACTOR THROUGH A PLURALITY CO-AXIAL CHANNELS OF AT LEAST ONE BURNER

602

INJECTING, A STREAM OF SWIRL GAS AT A FIRST VELOCITY INTO THE HYDROCARBON FEED STREAM, WHEREIN THE SWIRL GAS IS INJECTED TANGENTIALLY THROUGH AT LEAST ONE INJECTION NOZZLE PROVIDED WITHIN THE PLURALITY OF CO-AXIAL CHANNELS TO GENERATE A SWIRL MOTION WITHIN THE HYDROCARBON FEED STREAM, WHEREIN THE FIRST VELOCITY OF THE SWIRL GAS IS DETERMINED BASED ON PROGRAMMED PARAMETRIC FLAME LENGTH FUNCTIONS WITH RESPECT TO AT LEAST ONE OPERATIONAL PARAMETER OF THE REACTOR, USING A CONTROL SYSTEM

604

REGULATING, A LENGTH OF THE FLAME TO HAVE A CONSTANT FLAME SHAPE AND A POSITION INSIDE THE REACTOR BY REGULATING THE FIRST VELOCITY OF THE SWIRL GAS STREAM THAT GENERATES THE SWIRL MOTION WITHIN THE HYDROCARBON FEED STREAM

METHOD AND APPARATUS FOR REGULATING A FLAME LENGTH IN A PARTIAL OXIDATION REACTOR

CROSS REFERENCE TO RELATED APPLICATIONS

This application claims the benefit of priority under 35 U.S.C. § 119 (a) and (b) to European Patent Application No. 21020332.0, filed Jun. 30, 2021, the entire contents of which are incorporated herein by reference.

TECHNICAL FIELD

The present disclosure relates generally to partial oxidation of hydrocarbons, more specifically, to a method and apparatus for regulating a flame length for partial oxidation of hydrocarbon feed in a reactor for synthesis gas production.

BACKGROUND

Partial oxidation of hydrocarbon containing feedstock for the generation of synthesis gas is principally well known and a plurality of different processes and apparatuses are known in principle in the prior art. Typically, this process is carried out at high reactor temperatures in the range of 1200° C.-1500° C. and pressures of up to 100 bar. Known solution describes a process and related reactor for reacting a hydrocarbon-containing feedstock with an oxidizer stream inside the reactor. The streams are injected into the reactor by means of a burner. Different devices to inject and mix the different streams (i.e. oxidizer, hydrocarbon containing feedstock and sometimes a moderator) are disclosed in the known solutions. As moderator, carbon dioxide ($CO_2$) or steam is frequently applied which is fed separately into the reactor by a separate channel inside the burner or is admixed upstream of the burner to one or several streams. As an oxidizer, air, oxygen enriched air or pure oxygen (>95 mol %) is typically applied. A hydrocarbon containing feed stream is a stream containing hydrocarbons like methane or higher hydrocarbons or other molecules containing hydrogen and carbon (e.g. alcohols such as methanol, ethanol). This can also be a stream coming from a primary reformer upstream containing besides carbon monoxide (CO), hydrogen ($H_2$), $CO_2$, and water ($H_2O$), also hydrocarbons like methane, ethane, ethylene, propane, or higher hydrocarbons like benzene, toluene, xylenes. The mixing of the hydrocarbon containing feedstock and the oxidizer is typically carried out inside a reactor in close vicinity of the injecting nozzles. An intense mixing of the hydrocarbon containing feedstock with the oxidizer is preferred in order to obtain a high degree of conversion of the hydrocarbon containing feedstock into the synthesis gas by minimizing the consumption of the oxidizer. Another known solution describes a coaxial burner in which the different streams are co-annularly guided through a burner with different channels and mix outside. Mixing is achieved by the different exit velocities of the streams. In another known solution, besides pure co-axial injection of the different streams, also one or more streams can be inclined towards the center axis of the burner reactor alignment at the level of the nozzle exit. Other known solutions describe burners with fixed swirling devices utilizing blades. Known solution also describes a spiral like swirling chamber for the hydrocarbon containing feedstock and the stream is injected tangentially into this swirling chamber.

Fixed swirling devices by blades have the disadvantage that the swirl cannot be changed during operation. Therefore, the flame length and shape is a result of the geometric design of the burner and reactor, of the volumetric flow rates of the streams at operation condition and of the chemical composition of the streams. Similar observations are valid for non-swirled jet flames. Flame length and shape can be calculated by state-of-the-art Computational Fluid Dynamics (CFD). Additionally, scientific papers provide the general dependencies for flame lengths, e.g. according to A. Schumaker et al., Proc. Comb. Inst. 32 (2009) 1655-1662, the stoichiometric flame length of non-swirled co-axial jet burners is a function of the central injection diameter, the momentum ratio between the oxidizer and the hydrocarbon containing feedstock and the molar stoichiometric mixture fraction. Recently, A. Degeneve et at (Proc. Comb. Inst. 2018, 37 (4), 4563-4570, ISSN 1540-7489) has reported, that this dependency can be expanded to configurations using swirled co-axial jets by introducing the geometrical swirl number as an additional factor. With the need for an increased plant flexibility (not only by means of turn-down ratio but also concerning changing the obtained synthesis gas composition by means of different $H_2$/CO ratios), e.g. varying amounts of $CO_2$, can be admixed to the hydrocarbon containing feedstock stream upfront of the burner. This changes at least the momentum ratio of the different flows at the burner nozzles and consequently results in a different flame length and position inside the reactor. In extreme cases, this can lead to burner or refractory damages.

Besides the disadvantage of the fixed geometry, swirl blades are responsible of an additional pressure drop. Especially, for low pressure hydrocarbon containing feedstock streams originating e.g. from a blast furnace or a primary reformer (e.g., fixed bed or bubbling fluidized bed for biomass or waste reforming) that are typically operated at a slight overpressure of 50-3000 millibar (mbar), the additional pressure drop due to the swirl blades is important. Additionally, changes in feedstocks stream composition of the primary reformed gas are frequently observed, that may change flame properties within the subsequent Partial Oxidation (PDX) unit that cannot be mitigated by a fixed burner design with static blades.

Therefore, there is a need to address the aforementioned technical drawbacks in existing technologies to regulate a length of a flame inside a reactor during partial oxidation of the feedstock stream.

SUMMARY

The present disclosure seeks to provide an efficient method and apparatus for regulating a length of a flame for partial oxidation of hydrocarbon feed inside a reactor. An aim of the present disclosure is to provide a solution that overcomes at least partially the problems encountered in prior art and provide an improved method and apparatus for automatically regulating the flame length to have a constant flame shape and a position inside the reactor for partial oxidation of the hydrocarbon feed to protect the burner nozzles and refractory from too high temperatures that may cause damage under different operation conditions or hydrocarbon feed compositions. The object of the present disclosure is achieved by the solutions provided in the enclosed independent claims. Advantageous implementations of the present disclosure are further defined in the dependent claims.

According to a first aspect, there is provided a method for regulating a length of a flame for partial oxidation of hydrocarbon feed inside a reactor, the method comprising: injecting, a stream of oxidizer and the hydrocarbon feed into the reactor to produce the flame, wherein the stream of the oxidizer and the hydrocarbon feed are co-axially injected into the reactor through a plurality co-axial channels of at least one burner; injecting, a stream of swirl gas at a first velocity into the hydrocarbon feed stream, wherein the swirl gas is injected tangentially through at least one injection nozzle provided within the plurality of co-axial channels to generate a swirl motion within the hydrocarbon feed stream, wherein the first velocity of the swirl gas is determined based on programmed parametric flame length functions with respect to at least one operational parameter of the reactor, using a Control System; and regulating, the length of the flame to have a constant flame shape and a position inside the reactor by regulating the first velocity of the swirl gas stream that generates the swirl motion within the hydrocarbon feed stream.

The method according to present disclosure enables an automatic regulation of the length of the flame to have the constant flame shape and position inside the reactor for the partial oxidation of the hydrocarbon feed to protect the burner nozzles and refractory from high temperatures that may cause damage under different operation conditions or hydrocarbon feed compositions. The method enables to produce a stable anchored flame, thereby minimizing the size of the reactor required for the partial oxidation of the hydrocarbon feed. An additional advantage of the method according to the present disclosure is that the method enables to regulate the length of the flame to have the constant flame shape and position inside the reactor in dependence of the hydrocarbon feed composition, reactor load and oxidizer amount necessary to achieve the desired synthesis gas composition. The embodiments of the present disclosure do not require a fixed burner configuration. Thus, it is possible to regulate the length of the flame to have the constant flame shape and position inside the reactor for the partial oxidation of the hydrocarbon feed based on programmed parametric flame length functions with respect to at least one operational parameter of the reactor, using the Control System.

According to a second aspect, the present disclosure provides an apparatus for regulating a length of a flame for partial oxidation of a hydrocarbon feed in a reactor to produce synthesis gas, the apparatus comprising: at least one burner comprising a plurality of co-axial channels that comprises, a first channel to inject a stream of oxidizer into the reactor; a second channel to inject a stream of the hydrocarbon feed into the reactor, wherein the injection of the hydrocarbon feed stream and the oxidizer stream produces the flame inside the reactor; and a third channel to inject a stream of swirl gas at a first velocity into the hydrocarbon feed stream, wherein the swirl gas is injected tangentially through at least one injection nozzle of the third channel to generate a swirl motion within the hydrocarbon feed stream, wherein the at least one injection nozzle is in fluid connection with the second channel; a Control System that determines the first velocity of the swirl gas based on programmed parametric flame length functions with respect to at least one operational parameter of the reactor, and regulates the first velocity of the swirl gas that generates the swirl motion within the hydrocarbon feed stream to regulate the length of the flame to have a constant flame shape and a position inside the reactor.

The apparatus according to the present disclosure enables an automatic regulation of the length of the flame to have the constant flame shape and position inside the reactor for the partial oxidation of the hydrocarbon feed to protect the burner nozzles and refractory from high temperatures that may cause damage under different operation conditions or hydrocarbon feed compositions. The method enables to produce a stable anchored flame, thereby minimizing the size of the reactor required for the partial oxidation of the hydrocarbon feed. Additionally, in different embodiments, the apparatus enables to regulate the length of the flame to have the constant flame shape and position inside the reactor in dependence of the hydrocarbon feed composition, reactor load and oxidizer amount necessary to achieve the desired synthesis gas composition. Such an apparatus configuration enables to achieve the constant flame shape without requiring a fixed burner configuration.

Embodiments of the present disclosure eliminate the aforementioned drawbacks in existing known approaches for regulating a length of a flame for partial oxidation of hydrocarbon feed inside a reactor. The advantage of the embodiments according to the present disclosure is that the embodiments enable an automatic regulation of the length of the flame to have the constant flame shape and position inside the reactor for the partial oxidation of the hydrocarbon feed to protect the burner nozzles and refractory from too high temperatures that may cause damage under different operation conditions or hydrocarbon feed compositions. The embodiments enables to produce a stable anchored flame, thereby minimizing the size of the reactor required for the partial oxidation of the hydrocarbon feed stream. Additional aspects, advantages, features and objects of the present disclosure are made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. To illustrate the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, the same elements have been indicated by identical numbers. Embodiments of the present disclosure will now be described, by way of example only, with reference to the following diagrams wherein:

FIG. 6 is a flowchart illustrating a method of regulating a length of a flame for partial oxidation of hydrocarbon feed inside a reactor in accordance with an embodiment of the present disclosure.

DETAILED DESCRIPTION OF PREFERRED EMBODIMENTS

Figure 1:
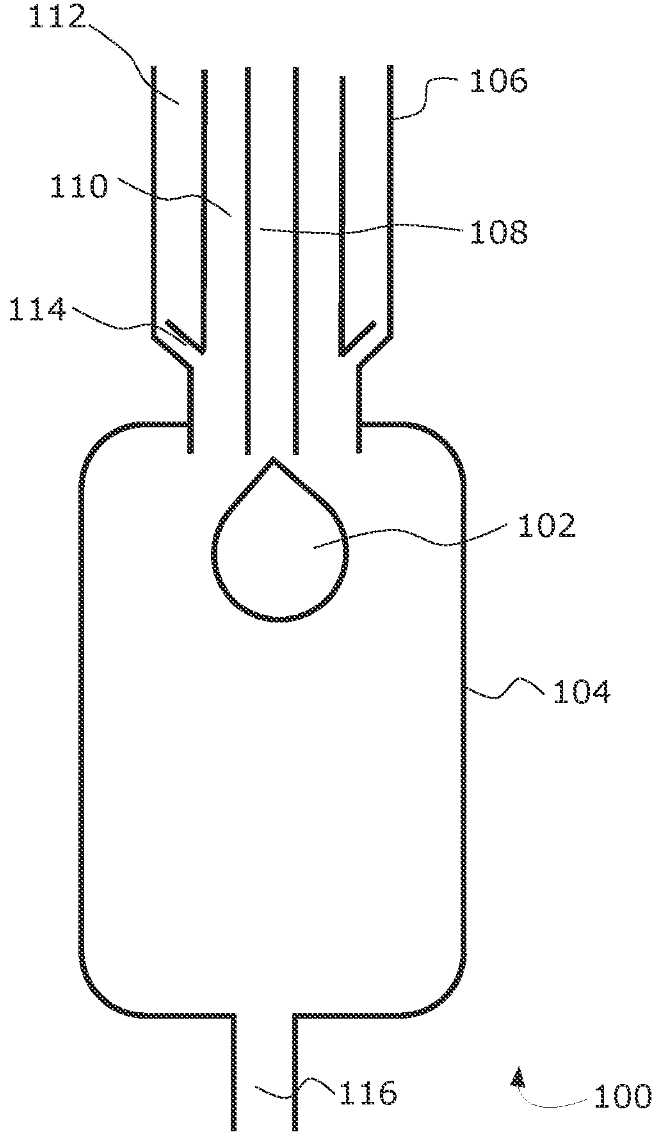
FIG. 1 is a schematic illustration of an apparatus for regulating a length of a flame for partial oxidation of hydrocarbon feed inside a reactor in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a method for regulating a length of a flame for partial oxidation of hydrocarbon feed inside a reactor, the method comprising: injecting, a stream of oxidizer and the hydrocarbon feed into the reactor to produce the flame, wherein the stream of the oxidizer and the hydrocarbon feed are co-axially injected into the reactor through a plurality co-axial channels of at least one burner; injecting, a stream of swirl gas at a first velocity into the hydrocarbon feed stream, wherein the swirl gas is injected tangentially through at least one injection nozzle provided within the plurality of co-axial channels to generate a swirl motion within the hydrocarbon feed stream, wherein the first velocity of the swirl gas is determined based on programmed parametric flame length functions with respect to at least one operational parameter of the reactor, using a Control System; and regulating, the length of the flame to have a constant flame shape and a position inside the reactor by regulating the first velocity of the swirl gas stream that generates the swirl motion within the hydrocarbon feed stream.

The advantage of the embodiment is that the method enables an automatic regulation of the flame length to have the constant flame shape and position inside the reactor for the partial oxidation of the hydrocarbon feed to protect the burner nozzles and refractory from too high temperatures that can cause damage under different operation conditions or hydrocarbon feed compositions. The method enables to produce a stable anchored flame, thereby minimizing the size of the reactor required for the partial oxidation of the hydrocarbon feed. An additional advantage of the method according to the present disclosure is that the method enables to regulate the flame length to have the constant flame shape and position inside the reactor in dependence of the hydrocarbon feed composition, reactor load and oxidizer amount necessary to achieve the desired synthesis gas composition. The embodiments of the present disclosure do not require a fixed burner configuration. Thus, it is possible to regulate the flame length to have the constant flame shape and position inside the reactor for the partial oxidation of the hydrocarbon feed based on programmed parametric flame length functions with respect to at least one operational parameter of the reactor, using the Control System.

When the stream of hydrocarbon feed and the oxidizer are co-axially injected into the reactor through the plurality co-axial channels of at least one burner, the flame is produced inside the reactor as a result of combustion. The stream of swirl gas is injected tangentially through at least one injection nozzle provided within the plurality of co-axial channels to generate the swirl motion within the hydrocarbon feed at the first velocity. The stream of swirl gas may be injected at a volume flow rate or a mass flow rate for generating the swirl motion within the hydrocarbon feed stream. Optionally, the first velocity of the volume flow rate per known injection area is the same.

The hydrocarbon feed includes hydrocarbons like methane, natural gas, Liquefied natural gas (LNG), propane-butane mixtures, liquefied petrol gas (LPG), higher hydrocarbons or mixtures like benzene, toluene, xylenes, naphta, pyrolysis oils or other molecules containing hydrogen and carbon like methane, ethane, ethylene, methanol, or ethanol. The oxidizer may be air, oxygen enriched air, or pure oxygen (>95 mol %). The side of the at least one burner facing the hot atmosphere inside the reactor may be additionally water cooled.

In an embodiment, the method further comprises injecting a stream of a moderator gas through the plurality co-axial channels of at least one burner, wherein the moderator gas is injected through a channel between the channels of the oxidizer stream and the hydrocarbon feed stream. The moderator gas is a cooling gas and the channel for injecting the moderator gas has a bottom end with fluid communication with the reactor. The moderator gas stream functions as a shielding stream between the oxidizer stream and the hydrocarbon feed stream.

In an embodiment, the first velocity of the swirl gas is regulated based on at least one of a composition of the hydrocarbon feed, a load of the reactor or an amount of the oxidizer required, to achieve a desired synthesis gas composition. The hydrocarbon feed may include varying compositions.

In an embodiment, the operational parameter of the reactor comprises at least one of a mass flow rate, a volumetric flow rate, a temperature, pressure of the oxidizer and the hydrocarbon feed, dimensions of the at least one burner, dimensions of the plurality co-axial channels or dimensions of the at least one injection nozzle.

In an embodiment, the programmed parametric flame length functions comprise correlation functions or tables for the flame length with respect to the at least one operational parameter of the reactor. The correlation functions may be obtained from parameterization of Computational Fluid Dynamics (CFD) simulations that involve simulating fluid motion using numerical approaches. The correlation functions may be obtained utilizing scaling relations for the flame length with respect to scaling laws (for example, as described in A. Degeneve et al., Proc. Comb, Inst., 2018, 37 (4), 4563-4570, ISSN 1540-7489).

In an embodiment, the plurality of co-axial channels of the at least one burner comprises an open bottom that is in fluid communication with the reactor. In an embodiment, the at least one injection nozzle is in fluid connection with the hydrocarbon feed stream.

In an embodiment, the swirl gas is a moderator gas, a waste gas, or a purge gas of a downstream synthesis plant, operated at high pressure and the swirl gas comprises a pressure that is higher than a pressure of the hydrocarbon feed stream. The pressure of the swirl gas is optionally 0.1-5 bar above the pressure of the hydrocarbon feed stream, typically the pressure of the swirl gas is 100-500 millibar (mbar) higher than the pressure of the hydrocarbon feed stream. The moderator gas may include steam, or carbon dioxide ($CO_2$). The $CO_2$ gas may advantageously be taken from a synthesis gas wash stage which is arranged downstream of the synthesis gas generation by the partial oxidation (POX) burner. The $CO_2$ may be separated from the synthesis gas using a Rectisol process that uses cold methanol as a solvent to separate $CO_2$ from the synthesis gas. In the Rectisol process, the cold methanol is used at a temperature of approximately −40 to −62° C. The waste gas/purge gas may be a methanol purge gas. The waste gas/purge gas may be a purge gas of a Fischer-Tropsch process that involves a multi-step reaction to convert a mixture of hydrogen ($H_2$) and carbon monoxide (CO) into aliphatic products.

The swirl gas may be any gaseous stream under operation condition that has a high pressure and volume flow to obtain the desired swirl within the hydrocarbon feed and that does not react with the hydrocarbon feed under injection conditions. Typically, but not limiting, the swirl gas stream originates from a gas-purification step. The swirl gas stream may be, for example, a compressed $CO_2$ rich stream from an acid gas removal unit utilizing amine-based solvents or cold methanol. The swirl gas may be a methanol tail gas. The swirl gas may be a tail gas of the Fischer-Tropsch process that involves a multi-step reaction to convert a mixture of $H_2$ and CO into the aliphatic products that has a significant higher pressure compared to the hydrocarbon feed stream. Superfluous swirl gas that is not required to achieve the desired swirl can be injected up-stream into the hydrocarbon feed so that no swirl is generated. Typically, the superfluous swirl gas is injected up-stream through the second channel of the at least one burner.

According to a second aspect, the present disclosure provides an apparatus for regulating a length of a flame for partial oxidation of a hydrocarbon feed in a reactor to produce synthesis gas, the apparatus comprising: at least one burner comprising a plurality of co-axial channels that comprises, a first channel to inject a stream of oxidizer into the reactor; a second channel to inject a stream of the hydrocarbon feed into the reactor, wherein the injection of the hydrocarbon feed stream and the oxidizer stream produces the flame inside the reactor; and a third channel to inject a stream of swirl gas at a first velocity into the hydrocarbon feed stream, wherein the swirl gas is injected tangentially through at least one injection nozzle of the third channel to generate a swirl motion within the hydrocarbon feed stream, wherein the at least one injection nozzle is in fluid connection with the second channel; a Control System that determines the first velocity of the swirl gas based on programmed parametric flame length functions with respect to at least one operational parameter of the reactor, and regulates the first velocity of the swirl gas that generates the swirl motion within the hydrocarbon feed stream to regulate the length of the flame to have a constant flame shape and a position inside the reactor.

The apparatus according to the present disclosure enables an automatic regulation of the flame length to have the constant flame shape and position inside the reactor for the partial oxidation of the hydrocarbon feed to protect the burner nozzles and refractory from high temperatures that may cause damage under different operation conditions or hydrocarbon feed compositions. The method enables to produce a stable anchored flame, thereby minimizing the size of the reactor required for the partial oxidation of the hydrocarbon feed. Additionally, in different embodiments, the apparatus enables to regulate the flame length to have the constant flame shape and position inside the reactor in dependence of the hydrocarbon feed composition, reactor load and oxidizer amount necessary to achieve the desired synthesis gas composition. Such an apparatus configuration enables to achieve the constant flame shape without requiring a fixed burner configuration.

The hydrocarbon feed includes hydrocarbons like methane, natural gas, Liquefied natural gas (LNG), propane-butane mixtures, liquefied petrol gas (LPG), higher hydrocarbons or mixtures like benzene, toluene, xylenes, naphta, pyrolysis oils or other molecules containing hydrogen and carbon like methane, ethane, ethylene, methanol, or ethanol. The oxidizer may be air, enriched air, or pure oxygen (>95 mol %). The side of the at least one burner facing the hot atmosphere inside the reactor may be additionally water cooled.

In an embodiment, the Control System that is configured to determine the first velocity of the swirl gas based on programmed parametric flame length functions with respect to at least one operational parameter of the reactor includes control devices being in communication with a Distributed Control System (DCS), In an embodiment, the Control System is integrated in the Distributed Control System (DCS).

In an embodiment, the at least one burner further comprises a fourth channel to inject a stream of a moderator gas, wherein the fourth channel is positioned between the first channel and the second channel. The moderator gas is a cooling gas and the channel for injecting the moderator gas has a bottom end with fluid communication with the reactor. The moderator gas stream functions as a shielding stream between the oxidizer stream and the hydrocarbon feed stream.

In an embodiment, the Control System regulates the first velocity of the swirl gas based on at least one of a composition of the hydrocarbon feed, a load of the reactor or an amount of the oxidizer required, to achieve a desired synthesis gas composition. The hydrocarbon feed may include varying compositions.

In an embodiment, the operational parameter of the reactor comprises at least one of a mass flow rate, a volumetric flow rate, a temperature, pressure of the oxidizer and the hydrocarbon feed, dimensions of the at least one burner, dimensions of the plurality co-axial channels or dimensions of the at least one injection nozzle.

In an embodiment, the programmed parametric flame length functions comprise correlation functions or tables for the flame length with respect to the operational parameter of the reactor. The correlation functions may be obtained from parameterization of Computational Fluid Dynamics (CFD) simulations that involve simulating fluid dynamics using numerical approaches. The correlation functions may be obtained utilizing scaling relations for the flame length with respect to scaling laws as described in A. Degeneve et al., Proc. Comb. Inst., 2018, 37 (4), 4563-4570, ISSN 1540-7489.

In an embodiment, the plurality of co-axial channels of the at least one burner comprises an open bottom that is in fluid communication with the reactor. In an embodiment, the at least one injection nozzle comprises tangential injection openings that are evenly distributed within the third channel. The swirl gas is supplied by a separate opening and flows to the co-axially arranged third channel which serves for even distribution of the tangential injection openings which are in fluid connection with the second channel. The tangential injection openings may include guide vanes to guide the flow of swirl gas efficiently through the at least one injection nozzle to generate a swirl motion within the hydrocarbon feed stream.

In an embodiment, the reactor comprises an outlet for the synthesis gas that is produced by the partial oxidation of the hydrocarbon feed in the reactor, wherein the outlet for the synthesis gas is provided at the bottom of the reactor. In an embodiment, the at least one burner is provided at the top of the reactor.

In an embodiment, the apparatus comprises at least two different thermocouples positioned inside the reactor at different axial heights to indicate the length and the position of the flame to regulate the first velocity of the swirl gas. The at least two different thermocouples may be positioned immediately adjacent to a refractory wall of the reactor, thus having a direct contact with the reactor. The apparatus may include a multi-point thermocouple positioned inside the reactor that is configured to measure temperature at various locations along the length of the sensor.

In an embodiment, the hydrocarbon feed is obtained from a primary reformer, operated at low pressure. The hydrocarbon feed from a primary reformer upstream includes besides CO, $H_2$, $CO_2$ and $H_2O$ also hydrocarbons like methane, ethane, ethylene or higher hydrocarbons like benzene, toluene, xylenes.

In an embodiment, the swirl gas is a moderator gas, a waste gas, a purge gas, or a tail gas of a downstream synthesis plant, operated at high pressure. The moderator gas may include steam, or $CO_2$, The $CO_2$ gas may advantageously be taken from a synthesis gas wash stage which is arranged downstream of the synthesis gas generation by the partial oxidation (POX) burner. The $CO_2$ may be separated from the synthesis gas using a Rectisol process that uses cold methanol as a solvent to separate $CO_2$ from the synthesis gas. In the Rectisol process, the cold methanol is used at a temperature of approximately −40 to −62° C. The waste gas/purge gas may be a methanol purge gas. The waste gas/purge gas may be a purge gas of a Fischer-Tropsch process that involves a multi-step reaction to convert a mixture of $H_2$ and CO into aliphatic products.

The swirl gas may be any gaseous stream under operation condition that has a high pressure and volume flow to obtain the desired swirl within the hydrocarbon feed and that does not react with the hydrocarbon feed under injection conditions. Typically, but not limiting, the swirl gas stream originates from a gas-purification step. The swirl gas stream may be for example, a compressed $CO_2$ rich stream from an acid gas removal unit utilizing amine-based solvents or cold methanol. The swirl gas may be a methanol tail gas. The swirl gas may be a tail gas of the Fischer-Tropsch process that involves a multi-step reaction to convert a mixture of $H_2$ and CO into the aliphatic products that has a significant higher pressure compared to the hydrocarbon feed stream. Superfluous swirl gas that is not required to achieve the desired swirl can be injected up-stream into the hydrocarbon feed so that no swirl is generated. Typically, the superfluous swirl gas is injected up-stream through the second channel of the at least one burner.

In an embodiment, the swirl gas comprises a pressure that is 0.1-5 bar, preferably 0.1-0.5 bar higher than a pressure of the hydrocarbon feed stream. FIG. 1 is a schematic illustration of an apparatus 100 for regulating a length of a flame 102 for partial oxidation of hydrocarbon feed inside a reactor 104 in accordance with an embodiment of the present disclosure. The apparatus 100 includes at least one burner 106 comprising a plurality of co-axial channels. The at least one burner 106 includes a first channel 108 to inject a stream of oxidizer into the reactor 104. The apparatus 100 includes a second channel 110 to inject a stream of the hydrocarbon feed into the reactor 104. The injection of the hydrocarbon feed stream and the oxidizer stream produces the flame 102 inside the reactor 104. The at least one burner 106 includes a third channel 112 to inject a stream of swirl gas at a first velocity into the hydrocarbon feed stream. The swirl gas is injected tangentially through at least one injection nozzle 114 of the third channel 112 to generate a swirl motion within the hydrocarbon feed stream. The at least one injection nozzle 114 is in fluid connection with the second channel 110. The apparatus 100 includes a Control System that determines the first velocity of the swirl gas based on programmed parametric flame length functions with respect to at least one operational parameter of the reactor and regulates the first velocity of the swirl gas that generates the swirl motion within the hydrocarbon feed stream to regulate the length of the flame 102 to have a constant flame shape and a position inside the reactor 104. The apparatus 100 includes an outlet 116 for the synthesis gas that is produced by the partial oxidation of the hydrocarbon feed in the reactor 104.

Figure 2:
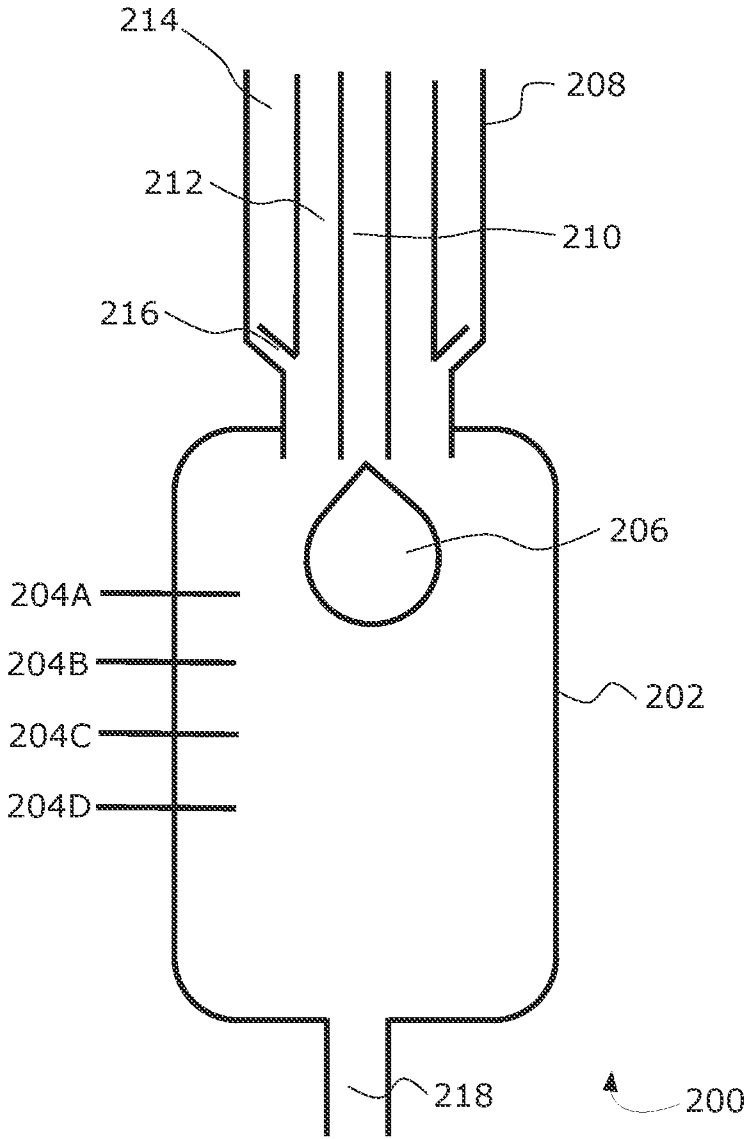
FIG. 2 is a schematic illustration of an apparatus with at least two different thermocouples for regulating a length of a flame for partial oxidation of hydrocarbon feed inside a reactor in accordance with an embodiment of the present disclosure.

FIG. 2 is a schematic illustration of an apparatus 200 with at least two different thermocouples 204A-D for regulating a length of a flame 206 for partial oxidation of hydrocarbon feed inside a reactor 202 in accordance with an embodiment of the present disclosure. The apparatus 200 includes at least one burner 208 comprising a plurality of co-axial channels. The at least one burner 208 that includes a first channel 210 to inject a stream of oxidizer into the reactor 202. The apparatus 200 includes a second channel 212 to inject a stream of the hydrocarbon feed into the reactor 202, The injection of the hydrocarbon feed stream and the oxidizer stream produces the flame 206 inside the reactor 202, The at least one burner 208 includes a third channel 214 to inject a stream of swirl gas at a first velocity into the hydrocarbon feed stream. The swirl gas is injected tangentially through at least one injection nozzle 216 of the third channel 214 to generate a swirl motion within the hydrocarbon feed stream. The at least one injection nozzle 216 is in fluid connection with the second channel 212. The apparatus 200 comprises at least two different thermocouple 204A-D positioned inside the reactor 202 at different axial heights to indicate the length and the position of the flame 206 to regulate the first velocity of the swirl gas. The apparatus 200 includes a Control System that determines the first velocity of the swirl gas based on programmed parametric flame length functions with respect to at least one operational parameter of the reactor and regulates the first velocity of the swirl gas that generates the swirl motion within the hydrocarbon feed stream to regulate the length of the flame 206 to have a constant flame shape and a position inside the reactor 202. The apparatus 200 includes an outlet 218 for the synthesis gas that is produced by the partial oxidation of the hydrocarbon feed in the reactor 202.

Figure 3:
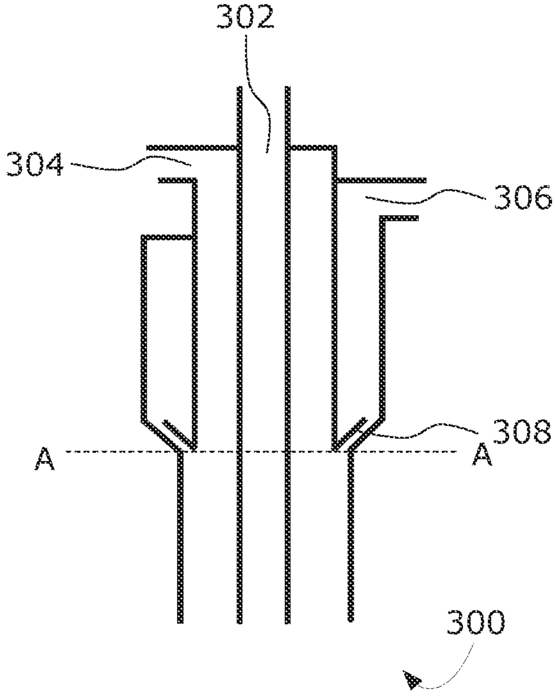
FIG. 3 is a schematic illustration of an arrangement of at least one burner of an apparatus for regulating a length of a flame for partial oxidation of hydrocarbon feed inside a reactor in accordance with an embodiment of the present disclosure.

FIG. 3 is a schematic illustration of an arrangement of at least one burner 300 of an apparatus for regulating a length of a flame for partial oxidation of hydrocarbon feed inside a reactor in accordance with an embodiment of the present disclosure. The at least one burner 300 includes a first channel 302 to inject a stream of oxidizer into the reactor. The apparatus includes a second channel 304 to inject a stream of the hydrocarbon feed into the reactor The injection of the hydrocarbon feed stream and the oxidizer stream produces the flame inside the reactor. The at least one burner 300 includes a third channel 306 to inject a stream of swirl gas at a first velocity into the hydrocarbon feed stream. The swirl gas is injected tangentially through at least one injection nozzle 308 of the third channel 306 to generate a swirl motion within the hydrocarbon feed stream. The at least one injection nozzle 308 is in fluid connection with the second channel 304.

Figure 4:
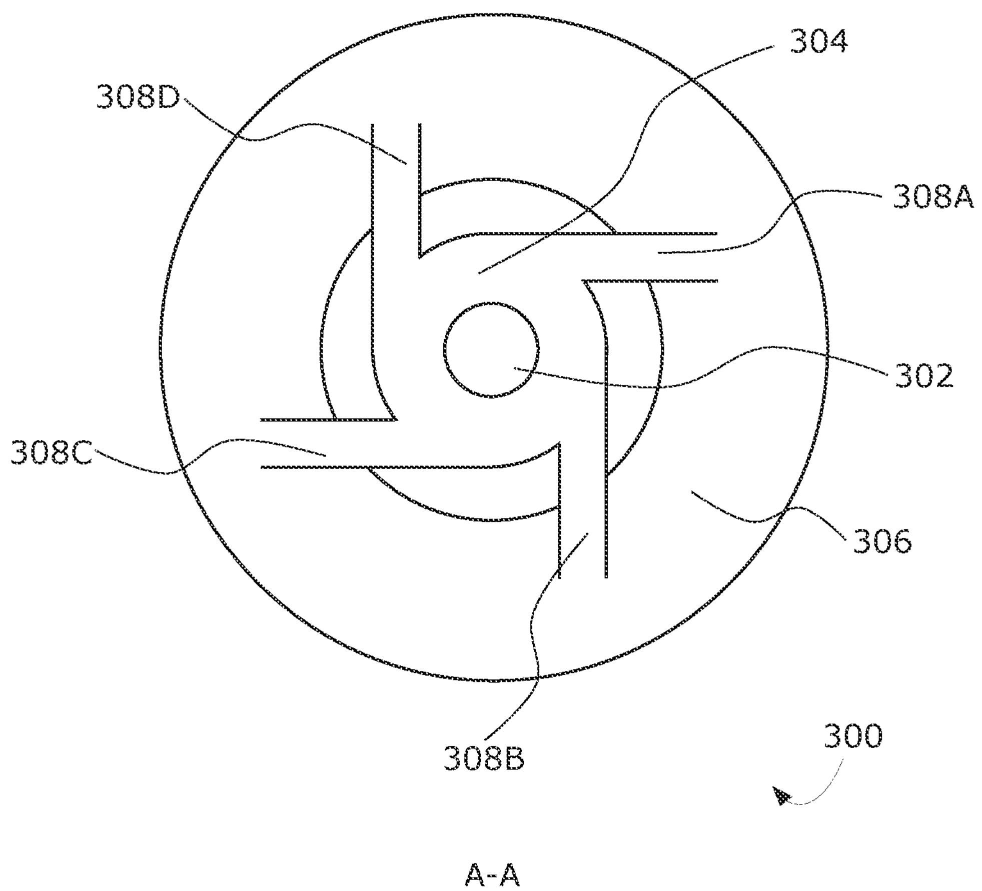
FIG. 4 is a schematic illustration of a cross-sectional view A-A of at least one burner of FIG. 3 having at least one injection nozzle for tangential injection of swirl gas into a hydrocarbon feed stream in accordance with an embodiment of the present disclosure.

FIG. 4 is a schematic illustration of a cross-sectional view A-A of at least one burner 300 of FIG. 3 having at least one injection nozzle 308A-D for tangential injection of swirl gas into a hydrocarbon feed stream in accordance with an embodiment of the present disclosure. The at least one burner 300 comprises a plurality of co-axial channels. The at least one burner 300 includes a first channel 302 to inject a stream of oxidizer into the reactor. The at least one burner 300 includes a second channel 304 to inject a stream of the hydrocarbon feed into the reactor. The injection of the hydrocarbon feed stream and the oxidizer stream produces the flame inside the reactor. The at least one burner 300 includes a third channel 306 to inject a stream of swirl gas at a first velocity into the hydrocarbon feed stream. The swirl gas is injected tangentially through at least one injection nozzle 308A-D of the third channel 306 to generate a swirl motion within the hydrocarbon feed stream. The at least one injection nozzle 308A-D is in fluid connection with the second channel 304.

Figure 5:
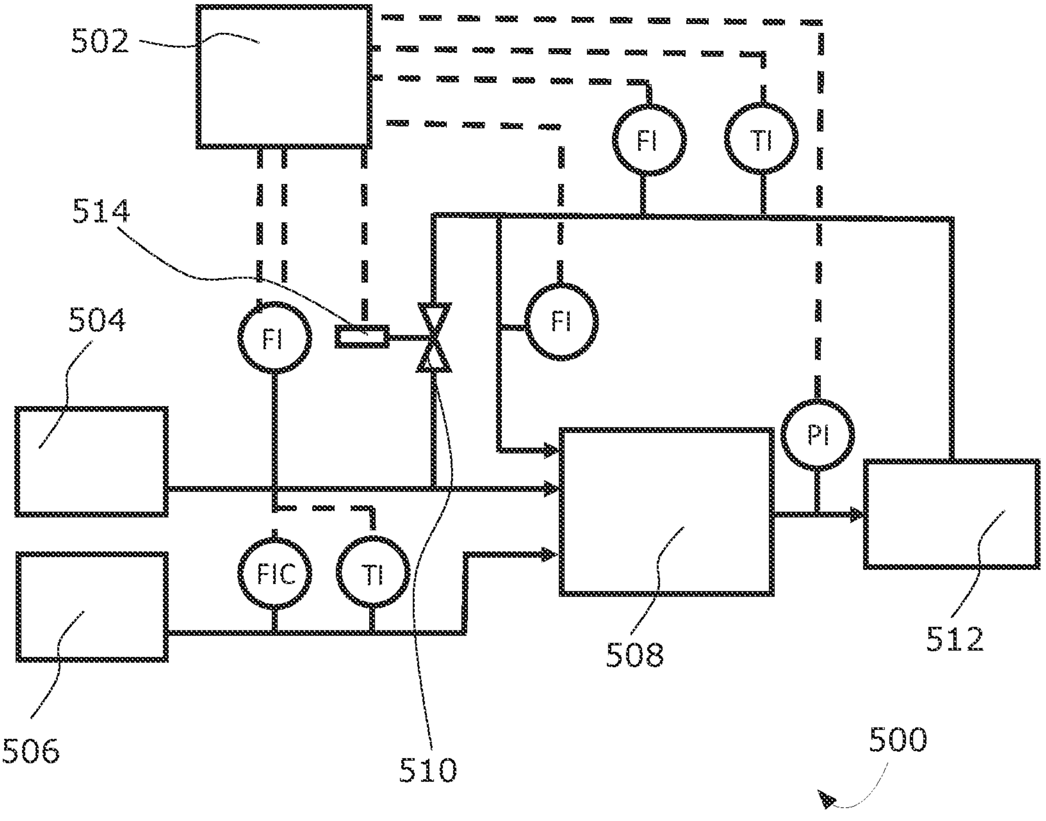
FIG. 5 is a schematic illustration of an apparatus for automatically regulating a length of a flame for partial oxidation of hydrocarbon feed inside a reactor in accordance with an embodiment of the present disclosure.

FIG. 5 is a schematic illustration of an apparatus for automatically regulating a length of a flame for partial oxidation of hydrocarbon feed inside a reactor in accordance with an embodiment of the present disclosure. The apparatus 500 comprises a Control System 502 that automatically controls the apparatus 500 for regulating a length of a flame for partial oxidation of hydrocarbon feed inside a reactor. The hydrocarbon feed is received from a primary reformer 504, operated at low pressure. The hydrocarbon feed is analyzed, and measured for temperature and volumetric flow before it is directed into a reactor 508 for partial oxidation of the hydrocarbon feed with an oxidizer. The oxidizer is received from e.g. an air separation unit or a storage tank 506. The oxidizer is measured and regulated according to the temperature and the volumetric flow rate of the hydrocarbon feed before it is directed into the reactor 508, A swirl gas stream is received from a downstream synthesis process 512, operated at high pressure. The temperature and volumetric flow of the swirl gas is measured before it is directed into the hydrocarbon feed stream. The apparatus 500 includes a flow control valve 510 to regulate the flow of the swirl into the hydrocarbon feed stream. The apparatus 500 includes an actuator 514 for the flow control valve 510. The Control System 502 determines a first velocity of the swirl gas based on programmed parametric flame length functions with respect to at least one operational parameter of the reactor. The at least one operational parameter comprises at least one of a composition of the hydrocarbon feed, a load of the reactor or an amount of the oxidizer required, to achieve a desired synthesis gas composition. The Control System 502 regulates the first velocity of the swirl gas that generates the swirl motion within the hydrocarbon feed stream to regulate the length of the flame to have a constant flame shape and a position inside the reactor 508. The apparatus 500 includes at least one Flow Indicator (FI) to indicate the volumetric flow of the hydrocarbon feed, oxidizer and the swirl gas to the Control System 502. The apparatus 500 includes at least one Temperature Indicator (TI) to indicate the temperature of the hydrocarbon feed, oxidizer and the swirl gas to the Control System 502. The apparatus 500 includes a Flow Indicator and Controller (FIC) that has an indicator function to indicate the flow of oxidizer to the Control System 502 and the Control System 502 sends signals to adjust the set point of the Flow Indicator and Controller (FIC) to regulate the flow of oxidizer into the reactor 508 based on the volumetric flow, composition, temperature and pressure measurement of the hydrocarbon feed. The swirl gas flow is regulated automatically by opening of the flow control valve 510 leading to the supply line of the hydrocarbon feed upfront of the at least one burner.

FIG. 6 is a flowchart illustrating a method of regulating a length of a flame for partial oxidation of hydrocarbon feed inside a reactor in accordance with an embodiment of the present disclosure. At step 602, a stream of oxidizer and the hydrocarbon feed is injected into the reactor to produce the flame. The stream of the oxidizer and the hydrocarbon feed are co-axially injected into the reactor through a plurality co-axial channels of at least one burner. At step 604, a stream of swirl gas is injected at a first velocity into the hydrocarbon feed stream. The swirl gas is injected tangentially through at least one injection nozzle provided within the plurality of co-axial channels to generate a swirl motion within the hydrocarbon feed stream. The first velocity of the swirl gas is determined based on programmed parametric flame length functions with respect to at least one operational parameter of the reactor, using a Control System. At step 606, the length of the flame is regulated to have a constant flame shape and a position inside the reactor by regulating the first velocity of the swirl gas stream that generates the swirl motion within the hydrocarbon feed stream.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be understood that many additional changes in the details, materials, steps and arrangement of parts, which have been herein described in order to explain the nature of the invention, may be made by those skilled in the art within the principle and scope of the invention as expressed in the appended claims, Thus, the present invention is not intended to be limited to the specific embodiments in the examples given above.

What is claimed is:

1. A method of regulating a length of a flame for partial oxidation of hydrocarbon feed inside a reactor, the method comprising:

injecting a stream of oxidizer and the hydrocarbon feed into the reactor to produce the flame, wherein the stream of the oxidizer and the hydrocarbon feed are co-axially injected into the reactor through a plurality of co-axial channels of at least one burner;

injecting a stream of swirl gas at a first velocity into the hydrocarbon feed stream, wherein the swirl gas is injected tangentially through at least one injection nozzle provided within the plurality of co-axial channels to generate a swirl motion within the hydrocarbon feed stream, wherein the first velocity of the swirl gas is determined based on programmed parametric flame length functions with respect to at least one operational parameter of the reactor, using a control system; and regulating the length of the flame to have a constant flame shape and a position inside the reactor by regulating the first velocity of the swirl gas stream that generates the swirl motion within the hydrocarbon feed stream, wherein the stream of oxidizer is in a central channel, wherein the hydrocarbon feed is in a first annular channel surrounding the central channel, wherein the stream of swirl gas is in a second annular channel surrounding the central channel and the first annular channel, wherein the stream of swirl gas is injected tangentially with respect to the hydrocarbon feed, wherein the stream of swirl gas is injected only into the hydrocarbon feed.

2. The method of claim 1, further comprising injecting a stream of a moderator gas through the plurality co-axial channels of at least one burner, wherein the moderator gas is injected through a channel between the channels of the oxidizer stream and the hydrocarbon feed stream.

3. The method of claim 1, wherein the first velocity of the swirl gas is regulated based on at least one of a composition of the hydrocarbon feed, a load of the reactor or an amount of the oxidizer required, to achieve a desired synthesis gas composition.

4. The method of claim 1, wherein the at least one operational parameter of the reactor comprises at least one of a mass flow rate, a volumetric flow rate, a temperature, pressure of the oxidizer and the hydrocarbon feed, dimensions of the at least one burner, dimensions of the plurality co-axial channels or dimensions of the at least one injection nozzle.

5. The method of claim 1, wherein the programmed parametric flame length functions comprise correlation functions or tables for the flame length with respect to the at least one operational parameter of the reactor.

6. The method of claim 1, wherein the plurality of co-axial channels of the at least one burner comprises an open bottom that is in fluid communication with the reactor.

7. The method of claim 1, wherein the at least one injection nozzle is in fluid connection with the hydrocarbon feed stream.

8. The method of claim 1, wherein the swirl gas is a moderator gas, a waste gas, or a purge gas of a downstream synthesis plant, operated at high pressure and wherein the swirl gas comprises a pressure that is 0.1-5 bar higher than a pressure of the hydrocarbon feed stream.

9. An apparatus for regulating a length of a flame for partial oxidation of a hydrocarbon feed in a reactor to produce synthesis gas, comprising:

at least one burner comprising a plurality of co-axial channels that comprises, a first channel to inject a stream of oxidizer into the reactor;

a second channel to inject a stream of the hydrocarbon feed into the reactor, wherein the injection of the hydrocarbon feed stream and the oxidizer stream produces the flame inside the reactor; and a third channel to inject a stream of swirl gas at a first velocity into the hydrocarbon feed stream, wherein the swirl gas is injected tangentially through at least one injection nozzle of the third channel to generate a swirl motion within the hydrocarbon feed stream, wherein the at least one injection nozzle is in fluid connection with the second channel;

a control system that determines the first velocity of the swirl gas based on programmed parametric flame length functions with respect to at least one operational parameter of the reactor; and regulates the first velocity of the swirl gas that generates the swirl motion within the hydrocarbon feed stream to regulate the length of the flame to have a constant flame shape and a position inside the reactor, wherein the first channel is a central channel, wherein the second channel is a first annular channel surrounding the first channel, wherein the third channel is a second annular channel surrounding the first channel and the second channel, wherein the stream of swirl gas is configured to be injected tangentially with respect to the hydrocarbon feed, wherein the stream of swirl gas is configured to be injected only into the hydrocarbon feed.

10. The apparatus of claim 9, wherein the control system regulates the first velocity of the swirl gas based on at least one of a composition of the hydrocarbon feed, a load of the reactor or an amount of the oxidizer required, to achieve a desired synthesis gas composition.

11. The apparatus of claim 9, wherein the at least one operational parameter of the reactor comprises at least one of a mass flow rate, a volumetric flow rate, a temperature, pressure of the oxidizer and the hydrocarbon feed, dimensions of the at least one burner, dimensions of the plurality co-axial channels or dimensions of the at least one injection nozzle.

12. The apparatus of claim 9, wherein the programmed parametric flame length functions comprise correlation functions or tables for the flame length with respect to the at least one operational parameter of the reactor.

13. The apparatus of claim 9, wherein the plurality of co-axial channels of the at least one burner comprises an open bottom that is in fluid communication with the reactor.

14. The apparatus of claim 9, wherein the at least one injection nozzle comprises tangential injection openings that are evenly distributed within the third channel.

15. The apparatus of claim 9, wherein the reactor comprises an outlet for the synthesis gas that is produced by the partial oxidation of the hydrocarbon feed in the reactor, wherein the outlet for the synthesis gas is provided at a bottom or at a lower side of the reactor.

16. The apparatus of claim 9, wherein the at least one burner is provided at the top of the reactor.

17. The apparatus of claim 9, wherein the apparatus comprises at least two different thermocouples positioned inside the reactor at different axial heights to indicate the length and the position of the flame to regulate the first velocity of the swirl gas.

18. The apparatus of claim 9, wherein the hydrocarbon feed is obtained from a primary reformer, operated at low pressure.

19. The apparatus of claim 9, wherein the swirl gas is a moderator gas, a waste gas, a purge gas, or a tail gas of a downstream synthesis plant, operated at high pressure.

* * * * *